(12) United States Patent
Ruffini

(10) Patent No.: US 8,763,057 B2
(45) Date of Patent: Jun. 24, 2014

(54) METHOD AND SYSTEM FOR ENHANCING DELIVERY OF THIRD PARTY CONTENT

(71) Applicant: Michael P. Ruffini, Methuen, MA (US)

(72) Inventor: Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/670,198

(22) Filed: Nov. 6, 2012

(65) Prior Publication Data

US 2014/0130104 A1 May 8, 2014

(51) Int. Cl.
*H04N 7/173* (2011.01)
(52) U.S. Cl.
USPC ............................ 725/95; 725/93; 725/94
(58) Field of Classification Search
USPC ............................................ 725/62, 93–95
See application file for complete search history.

(56) References Cited

U.S. PATENT DOCUMENTS

2012/0233640 A1* 9/2012 Odryna et al. .................. 725/45

OTHER PUBLICATIONS

Tony Werner, The Facts about Xfinity TV and Xbox 360: Comcast is Not Prioritzing, May 15, 2012. Entire document.*
Patrick Gray, Network Neutrality: Revisting the arguments, Jun. 26, 2012, entire document.*
Steven Musil, Netflix CEO criticizes Comcast on Net neutrality, data caps.*

* cited by examiner

*Primary Examiner* — Hunter B Lonsberry

(57) ABSTRACT

An approach for enabling third party video content to be assigned a higher priority for delivery over a service provider network is described. A content delivery platform determines whether a third party content provider or video content to be delivered fulfill one or more criteria for permitting the content delivery system direct access to a video on demand network of a network provider. The content delivery platform then assigns a higher delivery priority to the video content based on the direct access of the video on demand network by the content delivery system.

20 Claims, 8 Drawing Sheets

100

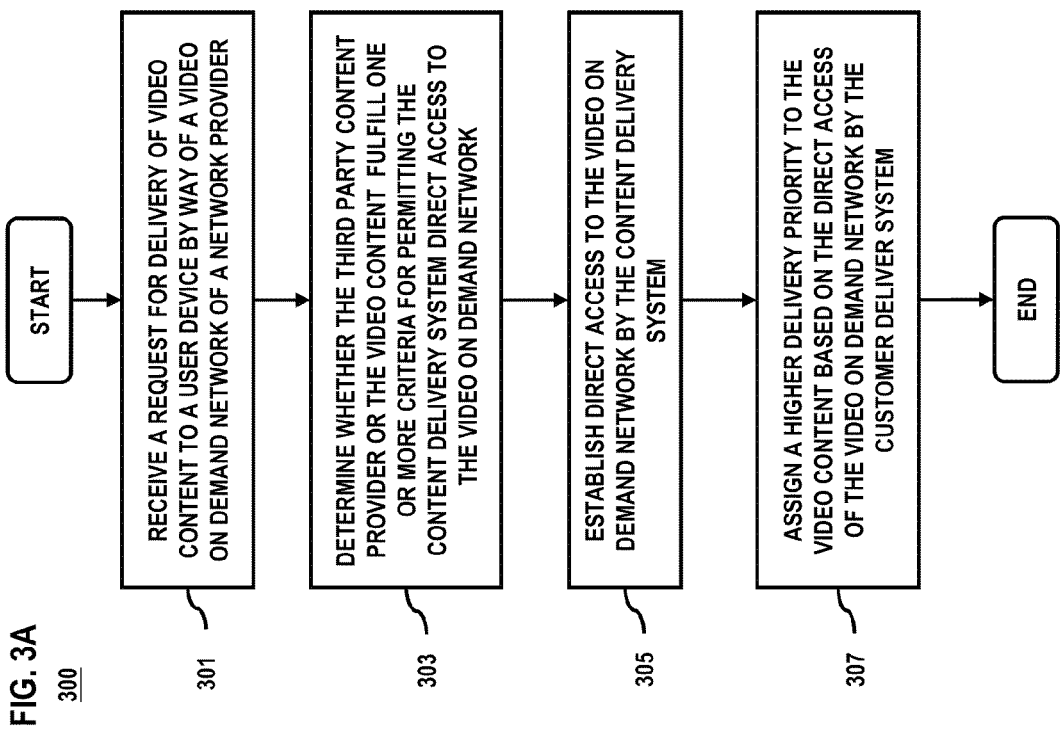

316

314

500

METHOD AND SYSTEM FOR ENHANCING DELIVERY OF THIRD PARTY CONTENT

BACKGROUND INFORMATION

Service providers are continually challenged to deliver value and convenience to consumers by providing compelling network services and advancing the underlying technologies. One area of interest has been the development of services and technologies for enhancing the content viewing experience of users. Many third party content providers provide applications for enabling users to access and execute content such as video on demand from their user devices. Timely delivery of the content to the user devices depends on the condition of the service provider network (e.g., the amount of congestion) as well as priority assigned to the content for delivery over the network. Unfortunately, third party content provider systems are not well integrated with service provider networks; consequently, delivery of content (e.g., video) may lack prioritization.

Based on the foregoing, there is a need for more integration among content systems and service provider infrastructure to provide effective prioritization of third party video content.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for enabling third party video content to be assigned a higher priority for delivery over a service provider network, according to various embodiments;

DESCRIPTION OF THE PREFERRED EMBODIMENT

An apparatus, method and software for enabling third party video content to be assigned a higher priority for delivery over a service provider network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to video content, it is contemplated that these embodiments have applicability to content and media of various types. This may include, for example, audio, live or on-demand streaming media, multimedia content, web objects (e.g., text, graphics, scripts), downloadable objects (e.g., media files, software, documents), applications (e.g., e-commerce, portals), social networks and the like for on-demand execution. As will be discussed more fully herein, the content may be generated and/or provided by one or more third party content providers for use in connection with a content delivery scheme, subscription based media platform or the like.

Figure 1:
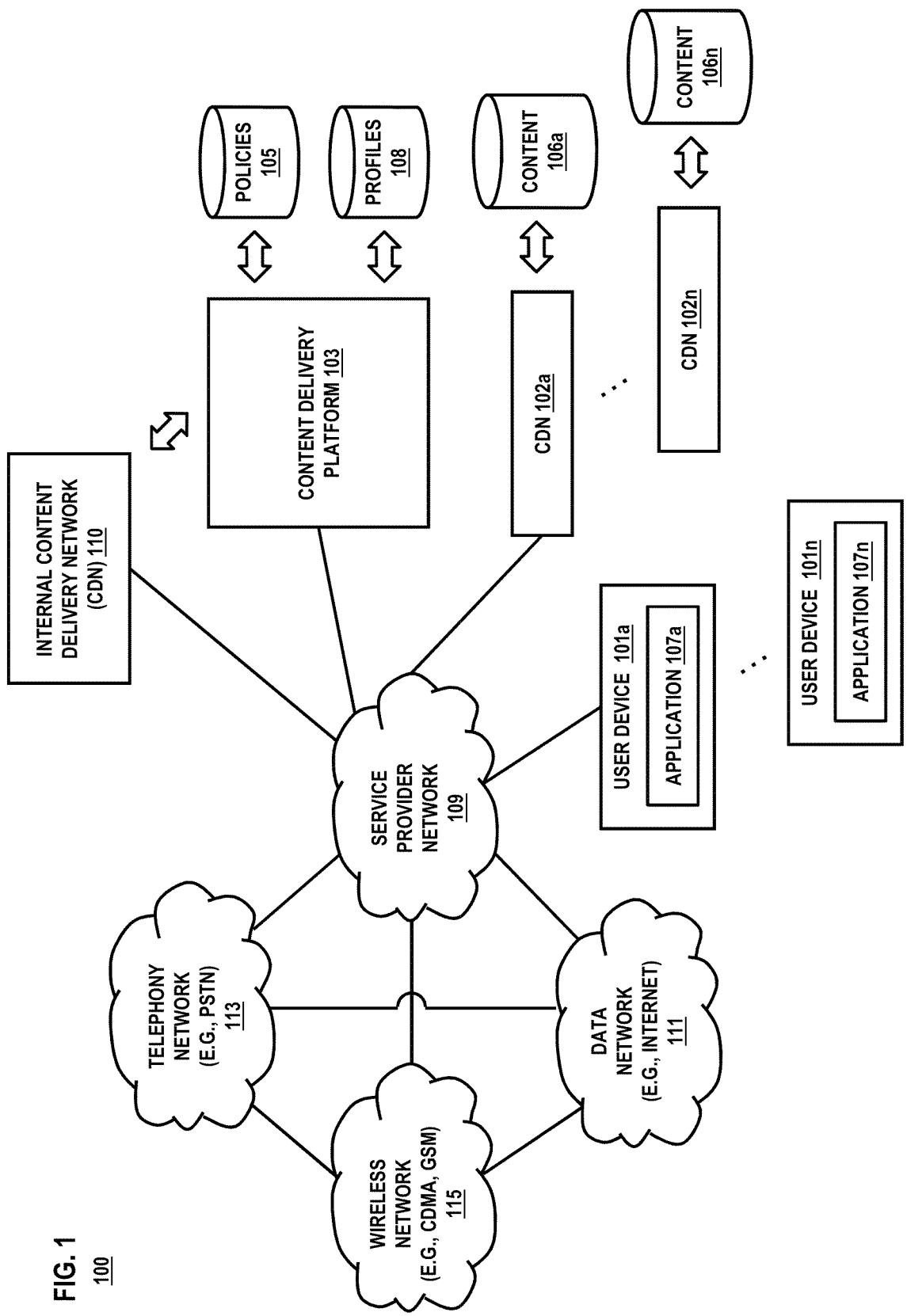
FIG. 1 is a diagram of a system for enabling third party video content to be assigned a higher priority for delivery over a service provider network, according to one embodiment.

FIG. 1 is a diagram of a system for enabling third party video content to be assigned a higher priority for delivery over a service provider network, according to one embodiment. By way of example, the third party content 106a-106n may include that which is provisioned to a user device 101a-101n upon request by one or more third party content providers. The third party content providers may present the content to users as an online library, where the featured content may be streamed or downloaded to user devices 101a-101n based on a subscription or user agreement. To facilitate distribution of the content 106a-106n, the third party content providers may employ one or more content delivery networks 102a-102n (CDNs). Typically, the CDNs 102a-102n include an array of interconnected servers and content centers distributed throughout various locations for delivering content to users with high availability and performance.

In some instances, the user devices may be configured to a service provider network 109. For example, the user devices may include smartphones, tablets, set-top boxes and other devices that employ the network infrastructure 109 of the service provider to access public (e.g., Internet) and private networks, perform wireless and telephony based communication, exchange data, etc. Under this scenario, when a user of a device 101a-101n requests content 106a-106n, the CDN 102a-102n associated with the content provider conveys the content to the network 109 to which the user device is configured rather than to the user device directly. Resultantly, the traffic as received is handled by the service provider network 109 as over the top traffic (OTT)—i.e., traffic that originates from an external data source (of the content provider) rather than directly from the provider of the network 109. The service provider network 109 therefore assigns a lesser delivery priority (e.g., best effort) to the content 106a-106n than assigned to other forms of traffic requiring transport via the network.

Due to this prioritization, the content 106a-106n is often delivered to the user device only after other higher priority traffic is transported, thus reducing the rate of delivery of the content 106a-106n to the requesting user. Furthermore, the overall quality of the content is diminished as the content is only permitted to be rendered at lower bit rates and resolutions versus other traffic. Still further, in cases where the service provider network 109 experiences packet loss, latency or other adverse traffic conditions, the third party content is more susceptible to being dropped (e.g., eliminated from the packet queue). All of these factors affect the quality of the user experience and the ability of third party content providers to meet customer demands.

To address these issues, system 100 of FIG. 1 introduces a content delivery platform 103, which is configured to interact with the service provider network and CDNs 102a-102n (referred to herein collectively as content delivery networks 102) for enabling more effective (optimized) delivery of third party/external content 106a-106n (referred to herein collectively as content 106). For the purpose of illustration, optimized delivery of third party content pertains to means for enabling a higher delivery priority to be assigned to packets comprising the content 106 for transport via a service provider network 109. In addition, the optimization includes means for enabling a higher bit-rate or resolution encoding of the packets comprising the content 106 for transport via the network 109. As will be discussed further, the content delivery platform 103 enables these optimization factors to be executed in connection with third party content conveyed to the network 109 according to a direct access scheme. The direct access includes enabling formation of a direct connection between a CDN 102 or other delivery agent associated with a content provider and an internal content delivery system or node of the service provider network 109.

The content delivery platform 103 may be implemented for execution within a service provider network. According to certain embodiments, one or more networks, such as data network 111, telephony network 113 and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions. The content delivery platform 103 may be further interfaced with external networks, including those of third party content providers, by way of various network interface and sharing arrangements and policies.

Still further, networks 109-115 may embody various content delivery components and facilities, which operate in connection with one another as an integrated video on demand (VOD) network. In this manner, the various components may be interconnected for enabling the transport of video content, broadcast signals and other content. For example, the VOD network may include one or more Super Head Ends (SHEs), which are national content centers for maintaining various television and video distribution equipment and content. The SHEs aggregate the content (e.g., as provided by one or more third party content providers), processes the content and encodes it per a given encoding format then distributes the content through its network to one or more video hub offices (VHOs). The VHOs serve as regional offices for distributing content received from one or more Super Head Ends (SHE) to end users within the region. Hence, the Video Hub Office (VHO) integrates the national content with any local/regional content (e.g., local advertisement media) for facilitating the on-demand services of various users (e.g., each VHO may serve a number of homes within a given metropolitan area).

The VOD network may also include one or more video switching offices (VSOs), which map the content for routing through an access network to the requesting device 101a-101n (e.g., set-top box, smartphone) of a user. The VSO may include an array of relays, gateways, switches, routers, servers and other components that are interconnected by way of various cables and channels for facilitating distribution of the content. It is noted that the VOD network may be accessed by subscribed user devices 101a-101n in connection with a video on demand service offering. For the purpose of illustration, the service provider network 109 may be taken as synonymous with or inclusive of a VOD network.

According to exemplary embodiments, one or more of the user devices 101a-101n may be utilized to communicate over system 100 and may include any customer premise equipment (CPE) capable of sending and/or receiving information over one or more of networks 109-115. For instance, a voice terminal may be any suitable plain old telephone service (POTS) device, facsimile machine, etc., whereas mobile device (or terminal) may be any cellular phone, radiophone, satellite phone, smartphone, wireless phone, or any other suitable mobile device, such as a personal digital assistant (PDA), pocket personal computer, tablet, customized hardware, etc. Further, the user devices 101a-101n may be any suitable computing device, such as a VoIP phone, skinny client control protocol (SCCP) phone, session initiation protocol (SIP) phone, IP phone, personal computer, softphone, workstation, terminal, server, etc. In certain embodiments, the user devices 101a-101n, referred to herein collectively as user devices 101, may further execute various applications 107a-107n, referred to herein collectively as applications 107, for initiating content requests via the network 109. This includes video content of third party providers, which may be optimized for delivery to the user devices 101 via the service provider network 109 by the content delivery platform 103.

It is noted that in addition to being subscribed with the network 109 for enabling video on demand, the user may also be subscribed with the third party content provider for accessing content 106. For example, a media player application or movie player may feature various user interface elements for enabling movie or television broadcast content selections of the third party content provider (e.g., a provider of content outside of the VOD network). Under this scenario, the content delivery platform 103 enables such selections to be delivered from an external delivery system of the third party content provider (e.g., a content delivery network (CDN)) to the user devices 101 configured to the VOD network (e.g., via service provider network 109) in the optimal manner described above—i.e., with a higher delivery priority or higher format.

In certain embodiments, the content delivery platform 103 may be implemented as a network service (e.g., cloud or hosted solution) capable of being called upon by a component of the network 109 in response to traffic from the CDN 102. Alternatively, the content delivery platform 103 may be implemented as an embedded controller configured for operation with respect to a component of the network 109. In either implementation, the platform 103 may receive a signal from a network access point (NAP) of the service provider network 109 for indicating a traffic delivery request from a CDN 102 associated with a content provider. The network access point (NAP) may be a router or bridge of a backbone network (not shown) of the service provider network 109 for interfacing with the CDN 102. It is noted that the NAP may parse various packets of the video content, including packet header information, to determine the delivery request. The packet headers may include bits for specifying a service type, delivery protocol, destination and source, a unique identifier associated with the third party content provider, etc.

In certain embodiments, the content delivery platform 103 determines whether the traffic as received is eligible to be assigned a higher delivery priority for transport via the video on demand network. Also, the content delivery platform 103 determines an eligibility of the encoding of the third party video content 106 to be adapted for enabling a higher quality of the video. By way of example, the determination is based on one or more admission control policies 105 of the provider of the network 109, which specify various rules and criteria for permitting deployment of third party content via direct access to the video on demand network. For the purpose of illustration, the direct access pertains to establishment of a direct connection, channel, or network pathway between the content delivery network 102 and the VOD network; such that the third party video content 106 may correspond to (e.g., substantially match) a delivery priority of video content that originates directly from a VHO, VSO or other content center or component associated with the video on demand network. As such, the third party traffic is not routed through the service provider network 109 to bypass the VOD network. Nor is the traffic managed as over-the-top traffic (OTT) traffic—as is typical for third party content 101—where it is delivered as best effort traffic instead of priority traffic or encoded at lower bit rates.

By way of example, the admission control policies 105 may specify that the third party content provider from which the video content 106 originates be registered with the content delivery platform 103 in advance. Hence, the content delivery platform 103 may determine whether this condition is met by cross referencing the third party video content against established profile information 108 for registered third party content providers. As noted previously, the registration may be established based on an agreement between the provider of the network 109 and the third party content provider. The cross referencing may include comparing a unique identifier, IP address or other details regarding the traffic against a network provider assigned identifier, network location information of the source content 106, network location information of the affiliated CDN 102 or other profile information 108. Per these criteria, only those third party content providers registered with the provider of the content delivery platform 103 (e.g., the network provider) may enable optimized delivery of their video content while that of unregistered third party content providers is delivered as standard or best effort traffic.

As another example, the policies 105 may specify the video content of the third party provider be pushed by the CDN 102 in advance of a delivery request or pulled from the CDN 102 or origin server of the content provider in response to a delivery request. Under this scenario, pulling of the third-party content 106 is performed by an internal content delivery network 110 associated with the video on demand network in real-time upon receipt of the content delivery request. The internal content delivery network 110 may be configured to operate in connection with a VHO or other content center of the network for facilitating the transport of content. As such, the content delivery platform 103 may cross reference the profile information 108 associated with the requesting content provider to determine a source/network location of the content to be pulled. In the case of a push operation, as conducted by the content provider, a metafile (e.g., extended markup language) may be submitted to the VOD network/service provider network 109 for indicating the location of the content to be pushed. Under this scenario, the push operation is performed in advance of submission of a delivery request or according to a predetermined schedule.

As another example, the policies 105 may specify the content 106 be transcoded adaptively so as to ensure the content does not fall below a predetermined quality threshold due to network traffic conditions. In certain embodiments, the content delivery platform 103 receives feedback regarding the status/condition of the VOD network from a monitoring system in order to determine whether the quality threshold (e.g., an amount of network degradation) has been fulfilled. This may include, for example, feedback for indicating an amount/rate of packet loss occurring at the network, a measure of time delay experienced in the system (latency), a level of instability of the network (jitter), etc. When the threshold is met, the content delivery platform 103 further determines a type of delivery priority to be assigned to the content; including an adaptive priority wherein the priority adjusts as the status of the VOD network changes. By way of this approach, the delivery priority of respective packets may be initially set to a lower value, but increase as network conditions become more favorable.

In certain embodiments, the delivery priority may correspond to a value of a bit (e.g., internet protocol (IP) precedence bit) or quality of service value as encoded in the various packets comprising the content 106. Alternatively, the delivery priority may be assigned based on a class of service value or ranking assigned to specific content and/or content providers (e.g., business class versus residential class). The prioritization schemes may vary from one network provider to the next. It is noted, however, that the content delivery platform 103 may signal the internal CDN 110 to adapt the delivery priority assigned to the third party content 106 for facilitating transport of the content to the user devices 101 via the network. In the case of adaptive transcoding of the content, the content delivery platform 103 may optionally signal to (a degree of degradation) has been met.

Also, in certain embodiments, the content delivery platform 103 may cause the internal CDN 110 to adapt the format of the third party video content 106 based on the determination of whether the third party content provider or the video content fulfills the one or more established policies 105. By way of example, the different format corresponds to a higher bit-rate or resolution of the third party video content being applied to the video content (e.g., from 720p to 1080p), which enhances the viewing experience of the user of the user device 101. Under this approach, the third party video content may be of a format that matches that of content originating from a content center associated with the video on demand network.

As noted, the above described policies 105, which are executed based on the fulfillment of specific criteria, dictate whether or not the third party traffic is eligible for being transported to end user devices 101 as if the traffic originated from within the VOD network. As such, the third party video content 106 may be marked with the same priority as video content originating from a VHO or VSO. By way of this approach, certain categories of traffic originating from the VHO, such as video on demand or interactive media guide data, can be excluded from usage based billing with the user devices 101.

It is also noted the above described delivery optimization procedure carried out by the content delivery platform 103 differs from transparent caching of the third party content. For example, transparent caching requires the VOD network of the service provider network 109 to cache certain content locally to reduce overall network bandwidth and cost for the network provider. In contrast, assigning a higher delivery priority or format to third party content enables content providers a reliable means of directing content on demand to subscribed users of the network 109. Also, per this approach, the network provider may derive revenue from third party content providers that require reliable, high quality content delivery to their customers. Hence, rather than being employed as cost savings mechanism, the approach described herein may be presented as a service offering to any third party content providers through a commercial agreement.

Figure 2:
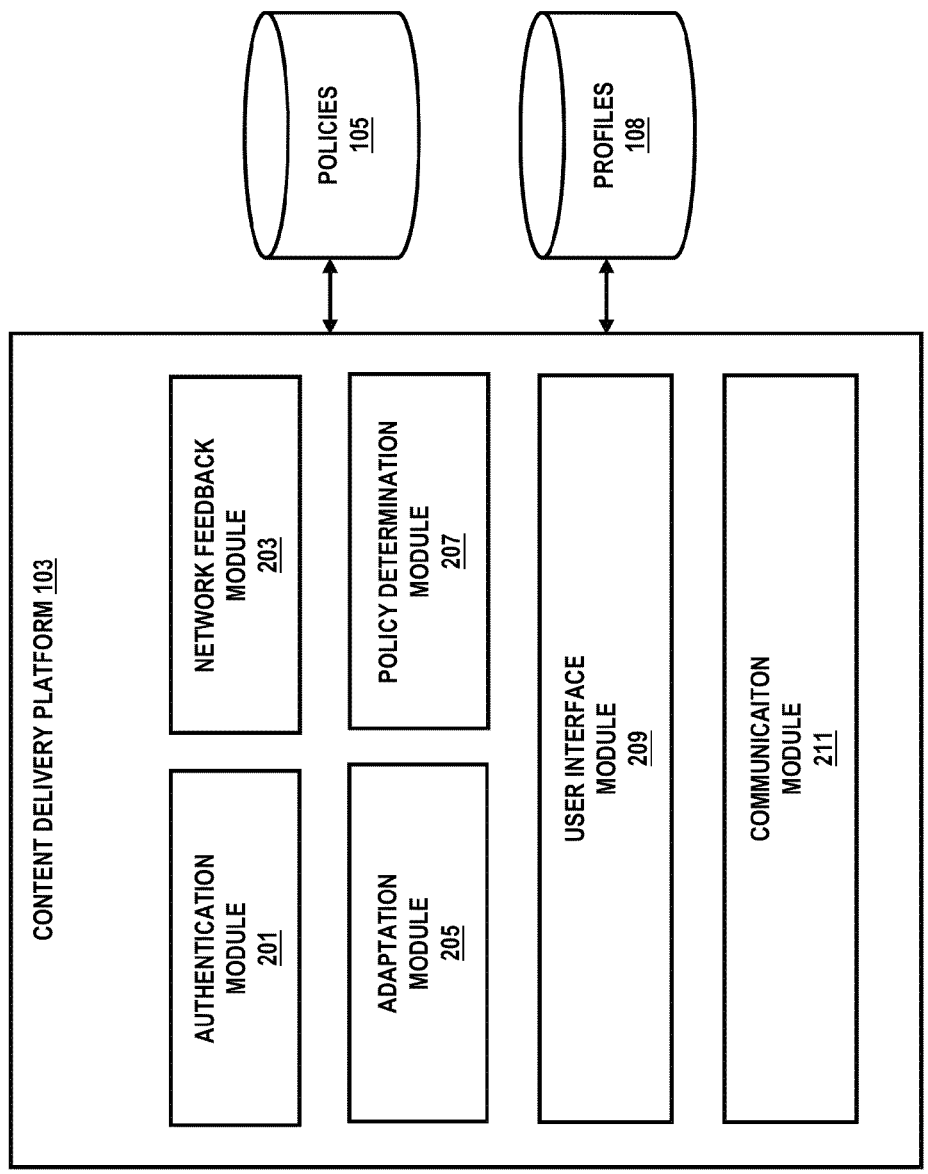
FIG. 2 is a diagram depicting the components of a bandwidth allocation platform, according to one embodiment.
Figure 3D:
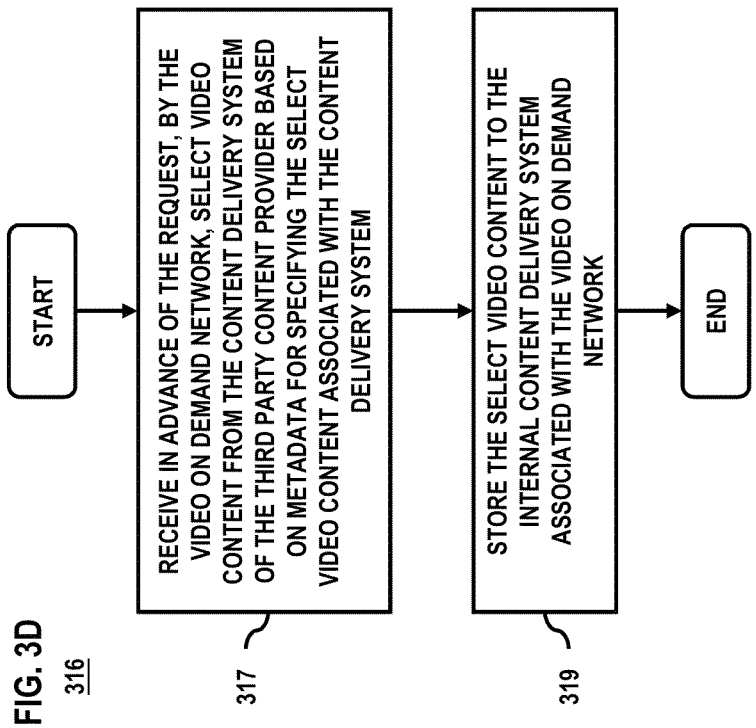
Figure 3C:
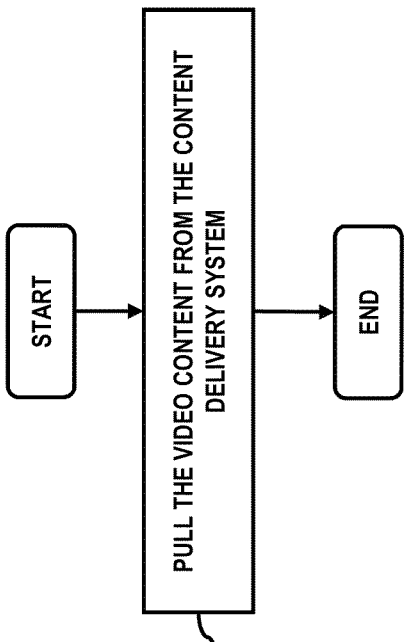

FIG. 2 is a diagram of a content delivery platform, according to one embodiment. The content delivery platform 103 includes various executable modules for performing one or more computing, data processing and network based instructions that in combination provide a means for enabling third party video content to be assigned a higher priority for delivery over a service provider network. Such modules can be implemented in hardware, firmware, software or a combination thereof. By way of example, the content delivery platform103 may include an authentication module 201, a network feedback module 203, an adaptation module 205, a policy determination module 207, a user interface module 209 and a communication module 211.

In addition, the content delivery platform103 also maintains policies for specifying criteria to be fulfilled for permitting direct access to a VOD network by third party (external) content providers. Also, profile information 108 is maintained for the third party content providers. It is noted the modules 201-211 of the content delivery platform103 may access databases 105 and 108 for performing various executable functions.

In one embodiment, an authentication module 201 authenticates third party content providers for interaction with the content delivery platform 103. By way of example, the authentication module 201 receives a request from a content provider to subscribe to the platform 103. The subscription process may include establishing a location of source content to be delivered via the network of the service provider, a name and/or type of format of the different content selections, a location of a content delivery network associated with the content provider, etc. In addition, the subscription process may include establishing a fee or revenue sharing arrangement between the content provider and the provider of the VOD network for enabling transport of content to user devices 101. Once established, the subscription details may be stored as profile information 108.

In addition, the subscription process may include the uploading of metadata in association with profile information 108 of a content provider for specifying video content to be pushed to the VOD network. This corresponds to a push operation of the content provider for interaction with the content delivery platform 103 and is executed in advance of delivery requests such as through establishment of a predetermined schedule. Also, the authentication module 201 may be configured to access the CDN 102 or another data source of the third party content provider for pulling content in real-time. Of note, the authentication module 201 may generate a signal for indicating to the internal CDN 110 that one or more content selections are to be pushed based on the metafile.

In one embodiment, the network feedback module 203 determines a current network condition of the VOD network. This may include receiving feedback information regarding currently latency conditions, jitter, etc., as measured by one or more other networking monitoring systems of the VOD network. In another embodiment, the policy determination module 207 may be configured to determine whether a particular content provider and/or particular video content meets specific criteria for enabling direct access to the VOD network. By way of example, the policy determination module 207 may receive the data from the feedback module 203 for determining whether a certain level of network quality (e.g., degradation) is achieved. As another example, the policy determination module 207 may compare packets of traffic to be delivered against the profile data 108 to determine a match between the content, a unique identifier of the requesting content provider, etc. It is noted that the policies 105 are established by the network provider per a service agreement between the network provider and different third party content providers.

In another embodiment, the adaptation module 205 causes a delivery priority of the traffic to be adapted based on the results of the policy determination module 207. In addition, the adaptation module 205 may adapt a format of video content based on the results of the policy determination module 207. For example, the adaptation module 205 may generate a signal for causing an internal CDN 110 to adjust and/or set a quality of service marking, IP precedence bit, or other value of the various packets of third party content in response to one or more criteria of the content provider/video content being fulfilled. As another example, the delivery priority may be adapted and/or set to a higher value in response to a determination that the requesting third party content provider is registered with the content delivery platform 103 or that the CDN for conveying the third party content is recognized by the platform.

Still further, the priority of the packets may be adapted in response to a determined level or status of the VOD network. For example, a higher bit rate or resolution of the traffic may be assigned to packets based on fulfillment of the various policies 105 or due to current network conditions. Still further, a quality of service marking of video content packets may be transcoded as adaptive to enable them to adjust to higher levels of delivery priority dynamically in response to network status changes. Still further, per the policies 105, the adaptation module 205 may at times assign an adaptive priority or format to the various packets for enabling the delivery priority or format to adjust as the status of the VOD network changes.

In one embodiment, the user interface module 209 facilitates generation of various interfaces for enabling users and advertisement providers to interact with the content delivery platform 103. This includes, for example, generation of a content provisioning interface for enabling third party content providers to input and/or define metadata for enabling the pushing of select video content to the VOD network in advance. By way of example, the user interface module 209 may generate different user interface elements for selection by registered third party content providers, such as action buttons, for receiving the appropriate input from users in connection with the advertisement content. It is noted that the user interface module 209 may be activated by way of various application programming interfaces (APIs) or other function calls at a computing device of the third party content provider.

In one embodiment, the communication module 211 executes various protocols and data sharing techniques for enabling collaborative execution between the content delivery platform 103 and the VOD network. For example, the communication module 211 may generate a signal for indicating a delivery priority of incoming traffic is to be adapted by an internal content delivery system. As another example, the communication module 211 may generate and transmit a signal to a network access point of the VOD network for indicating a traffic delivery request is being presented.

The above described modules 201-211 and components of the content delivery platform103 can be implemented in hardware, firmware, software, or a combination thereof. Though depicted as a separate entity in FIG. 1, it is contemplated that the content delivery platform 103 may be implemented for direct operation by various components of the service provider network, such as a router, gateway, backbone system or other network access point. As such, the platform 103 generates direct signal inputs by way of the operating system of the network access point. In another embodiment, one or more of the modules 201-211 may be implemented for operation as a platform 103 maintained as a hosted solution.

FIGS. 3A-3D are flowcharts of processes for enabling third party video content to be assigned a higher priority for delivery over a service provider network, according to various embodiments. For the purpose of illustration, the processes are described with respect to FIG. 1. It is noted that the steps of the processes may be performed in any suitable order, as well as combined or separated in any suitable manner.

In step 301 of process 300, the content delivery platform 103 receives a request for delivery video content to a user device by way of a video on demand network of a network provider. The request may be conveyed to the video on demand network—i.e., via a network access point of the network—by a content delivery system associated with a third party content provider. In another step 303, the platform 103 determines, based on an admission control policy of the network provider, whether the third party content provider or the video content fulfill one or more criteria for permitting the content delivery system direct access to the video on demand network. As noted previously, the criteria set forth by the policies may include a registration status of the content provider with respect to the content delivery platform 103 or a network status of the network. In addition, the criteria may pertain to an accessibility of related video content as provided by the third party content provider in advance of a delivery request (e.g., per a push procedure).

In step 305, the content delivery platform 103 establishes direct access to the video on demand network by the content delivery system. As noted, the direct access includes access to an internal content delivery system associated with the video on demand network. Per step 307, the internal content delivery system is caused, by the content delivery platform 103, to assign a higher delivery priority to the video content based on the direct access of the video on demand network by the customer deliver system. It is noted that the higher delivery priority corresponds to a delivery priority of video content that originates directly from a content center (e.g., a video hub office) associated with the video on demand network. For example, such correspondence of priorities enables the video content to be delivered using substantially matching priorities as to ensure similar or comparable quality (e.g., from the perspective of the users or subscribers).

In step 309 of process 308 (FIG. 3B), the content delivery platform 103 determines a status of the video on demand network. This may include, for example, receiving status information from a monitoring system employed by the network provider. Of note, the status is based on an amount of congestion of the video on demand network, an amount of pending or scheduled delivery requests, a mode of operation of the video on demand network, or a combination thereof. In another step 311, the platform 103 determines a type of delivery priority to be assigned to the video content, a type of format of the video content, or a combination thereof. The type of delivery priority is based on a quality of service marking associated with the video content. Also, the delivery priority is adaptive, such that it may be adjusted (up) as network conditions change over time.

In step 313, the content delivery platform 103 assigns a different format to the video content based on the determination of whether the third party content provider or the video content to be delivered fulfills the one or more criteria. As noted previously, the different format enables the video content to substantially match a format of content that originates from a content center associated with the video on demand network. Also, the assigned format of the video content is of a higher bit-rate or higher resolution. By way of example, the format may be adapted/assigned from a standard resolution to a higher resolution for enhancing the user viewing experience.

Per step 315 of process 314 (FIG. 3C), the content delivery platform 103 triggers the internal content delivery system of the video on demand network to pull the video content from the content delivery system. As noted previously, the pulling is performed in real-time in response to a delivery request submitted to the VOD network by a third party content provider. It is noted that, per the direct access to the VOD network, the third party content provider may redirect specific video on demand requests to internal content delivery network of the network provider, thus triggering pulling of the requested content from the origin server of the third party content provider.

The content delivery platform 103 causes the internal content delivery system of the service provider network to interact with the third party content provider based on a push procedure. As such, per step 317 of process 316 (FIG. 3D), the internal content delivery system receives, in advance of the request select video content from the content delivery system of the third party content provider based on metadata for specifying the select video content associated with the content delivery system. In another step 319, the internal content delivery system also stores the select video content to the internal content delivery system associated with the video on demand network. As noted previously, the metadata may include data for specifying a name, source location and format of the select video content. Also, the video content to be delivered per the original video on demand request is retrieved from the internal content delivery system for delivery to the user device by way of the video on demand network.

Figure 4:
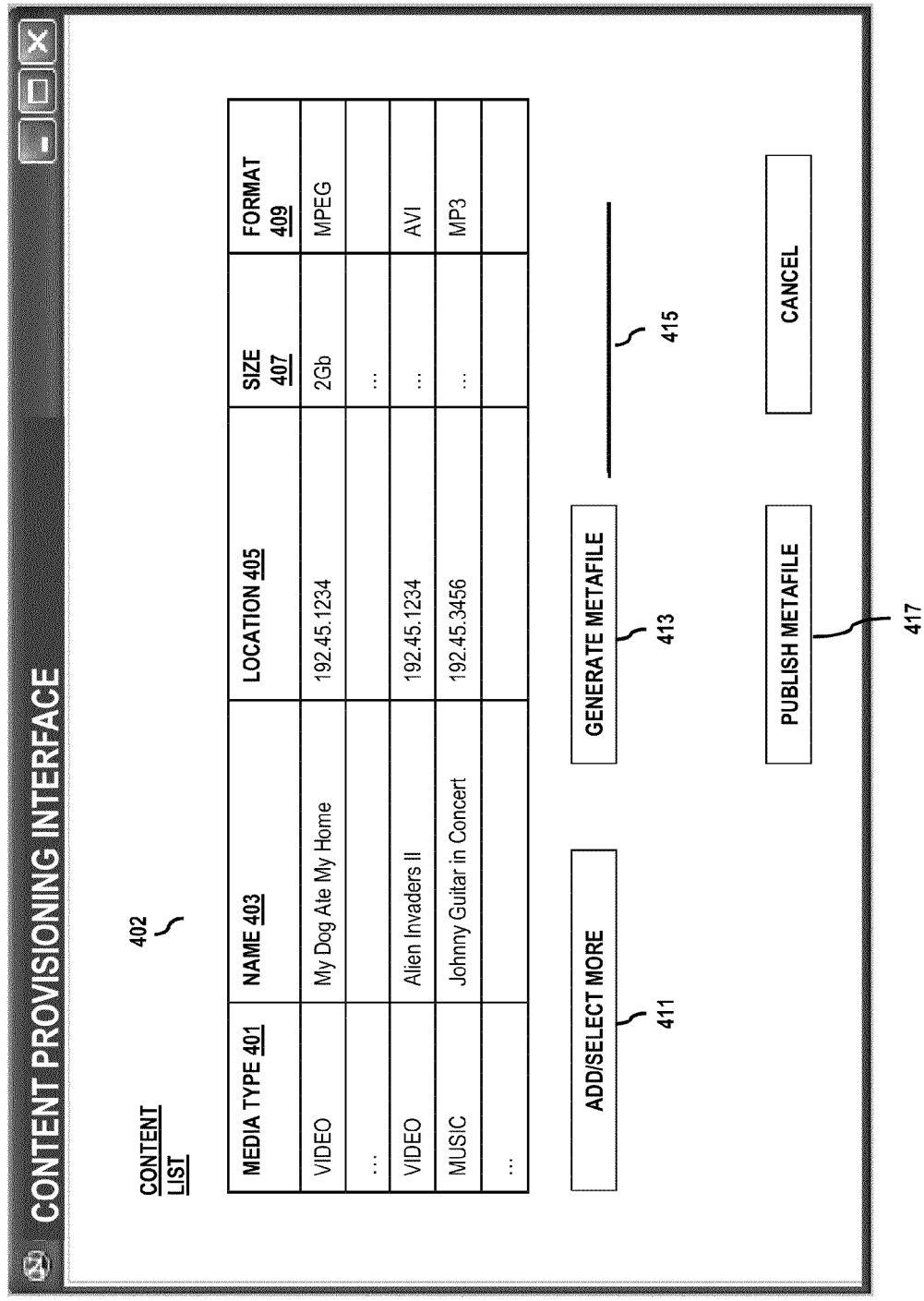
FIG. 4 is a diagram of a user interface depicting user interaction with the content delivery platform, according to one embodiment.

FIG. 4 is a diagram of a user interface depicting user interaction with the content delivery platform, according to one embodiment. By way of example, the user interface depiction corresponds to a content provisioning interface for enabling registered content providers to input and/or define metadata for enabling the pushing of select video content to the VOD network in advance. For the purpose of illustration, the content provisioning interface 400 may be accessed by the third party content provider during a subscription procedure with the content delivery platform 103 or at a subsequent time by an already subscribed content provider for impacting which content is pushed to the VOD network of the service provider network 109.

In FIG. 4, the interface presents a content list 402 for receiving user input regarding the content to be pushed to the VOD network. A first column of the list (e.g., table) 402 corresponds to data for indicating a media type 401 to be pushed. A second column and third column of the list 402 corresponds to a name 403 and network location 405 of the content. The name may correspond to a filename or alternatively, a commercial name to which the content is related (e.g., the name of an album or movie). The fourth and fifth column of the list 402 corresponds to a size 407 and format (type) 409 of the content to be pushed. The list 402 may be populated manually by the content provider or by way of a selection process per an ADD/SELECT MORE action button 411.

In the latter case, for example, when the content provider activates the ADD/SELECT MORE action button 411, a file selection window may be presented to the user. From this window, the user may highlight (via mouse) one or more files to be pushed to the VOD network, including movies, audio and other forms of media. Upon acceptance of these selections, the various entries (columns) of the list 402 for each selected file/content item are populated accordingly. Once the list is populated, the content provider may select the GENERATE METAFILE action button 413 in order to create a metafile corresponding to the list 402. Hence, the metafile may specify the various content selections along with the corresponding characteristics of each selection. Under this scenario, the content provider may enter a filename to associate with the metafile via a user entry field 415 then publish the metafile through selection of a PUBLISH METAFILE action button 417.

It is noted that the published metafile may generated as an XML file, text file or per any other format. Also, publishing of the metafile may pertain to storage of the metafile as generated at an agreed upon network location for retrieval by the network service provider, i.e., the metafile may be maintained by the content delivery platform 103 in connection with profile information for the content provider. The publishing and formatting requirements may be established per the service agreement between the third party content provider and the provider of the VOD network. In addition, the metafile may be adapted periodically or on demand by the content provider for impacting the availability of on demand content via the VOD network. Of note, the push procedure is executed based on direct access of the third party content provider to the VOD network.

Figure 5:
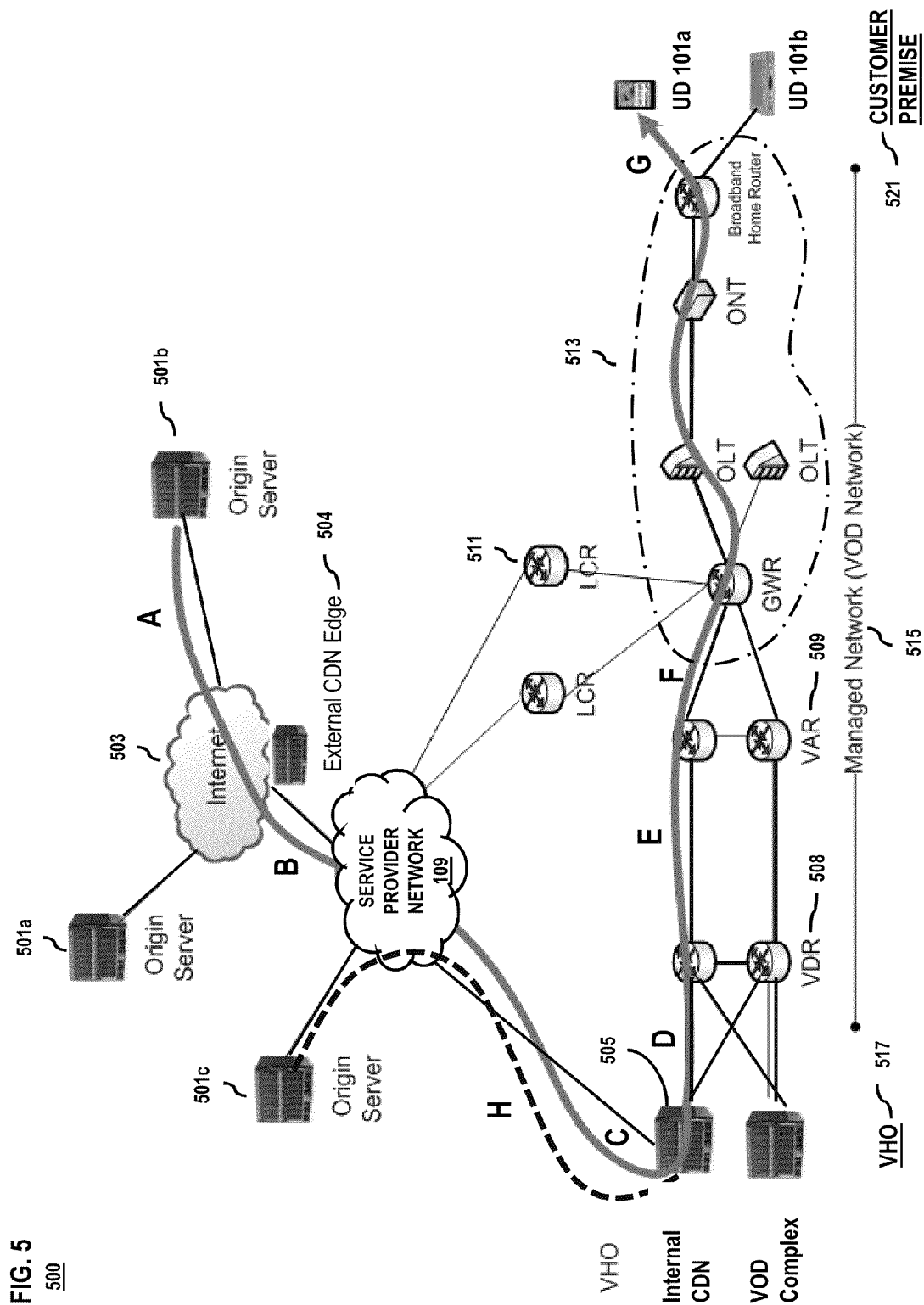
FIG. 5 is a diagram depicting a flow of data from a third party content provider to a user device configured to a service provider network, according to one embodiment.

FIG. 5 is a diagram depicting a flow of data from a third party content provider to a user device configured to a service provider network, according to various embodiments. For the purpose of illustration, the flow is depicted as one or more data flow steps labeled A-H, which corresponds to the flow of content from the point of origin (e.g., service supplied via server 501) through a VOD network 515 and on to an end user device 101. Hence, the flow as presented depicts that which is executed per the customer delivery platform 103 for permitting end-to-end delivery of the external/third party content from a VHO 517 of the VOD network 515 to a customer premise 521. It is noted, therefore, that per the direct access procedure carried out via the content delivery platform 103 the content provider is permitted to leverage the VOD network 515 in its entirety as a transport mechanism.

In step A, the content at the origin server 501*b* of a third party content provider conveys its content to be delivered to a content delivery network (CDN) edge device 504 configured to a network 503 (e.g., the Internet). In step B, the CDN edge device 504 then submits a request for delivery of the content to the service provider network 109. While not shown, the content request may be initially received by a network access point (not shown) of the service provider network 109. It is noted that in the absence of a direct access service agreement between the content provider and the network provider, the content at step B would be passed to a least cost router (LCR) 511 and onto a standard array 513 of gateways, OLT (Optical Line Terminal) and ONT (Optical Network Terminal), ONU (Optical Network Unit), broadband routers, etc., for delivery to the customer premise 521; thus completely bypassing the primary components and facilities of the VOD network 515.

After the request is acknowledged and it is determined the traffic received and the third party content provider meet one or more admission control policies/criteria, direct access to the VOD network 515 is enabled per the request. As such, in step C, the content is further passed on the internal CDN 505 of the service provider network 109. The internal CDN 505 is configured to operate in connection with the video on demand complex (e.g., the VHO) 517, wherein the internal CDN 505 may permit the delivery of the third party content along with or at the same level of priority as content originating from the VHO 517. In addition, the internal CDN 505 may adapt a format of the content to be delivered such that the resolution or bit rate quality of the video is substantially similar to content originating directly from the VHO 517. As noted, this assignment/adaptation is triggered for execution by the internal content delivery network 505 by the content delivery platform 103.

As such, in steps D and E, the content is assigned a higher delivery priority and transported from the internal CDN 505 to a video digital recording (VDR) system 508 and value added reseller system 509 respectively. At these points along the delivery path, the content may be integrated for use in connection with a VDR media center of the user devices as well as localized relative to the location of the users (e.g., local commercial content integration). At step F, the content is then transported to the standard array 513 of gateways, optical connectors, etc., for ultimate delivery to the requesting user device 101*a* at the customer premise 521, corresponding to step G. It is noted that the content, which originated from an external content provider, is thus delivered upon request as if it originated from the VHO 517 of the service provider network 109 to which the user devices 101 are configured.

It is further noted that in the case of a push procedure, the third party content provider may expose metadata to the VOD network 515 for indicating which content is to be pushed to the internal CDN 505 in advance of a delivery request. By way of example, the metafile published for access by the VOD network 515 may specify a location of the content as an origin server 501*c*. Under this scenario, the content delivery platform 103 generates a signal for indicating to the internal CDN 505 that content is to be pushed. Thus, the content as specified per the metafile is directed to the internal CDN 505 by the origin server 501*c* of the third party content provider, corresponding to step H.

The exemplary techniques and systems presented herein enables video on demand (VOD) network providers to permit direct access to their network by third party content providers. By way of this direct access, the third party content may be delivered to end users via the VOD network at a higher delivery priority or higher format. In addition, the network service providers may receive incentives from the third party content providers for enabling the direct access.

The processes described herein for enabling third party video content to be assigned a higher priority for delivery over a service provider network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
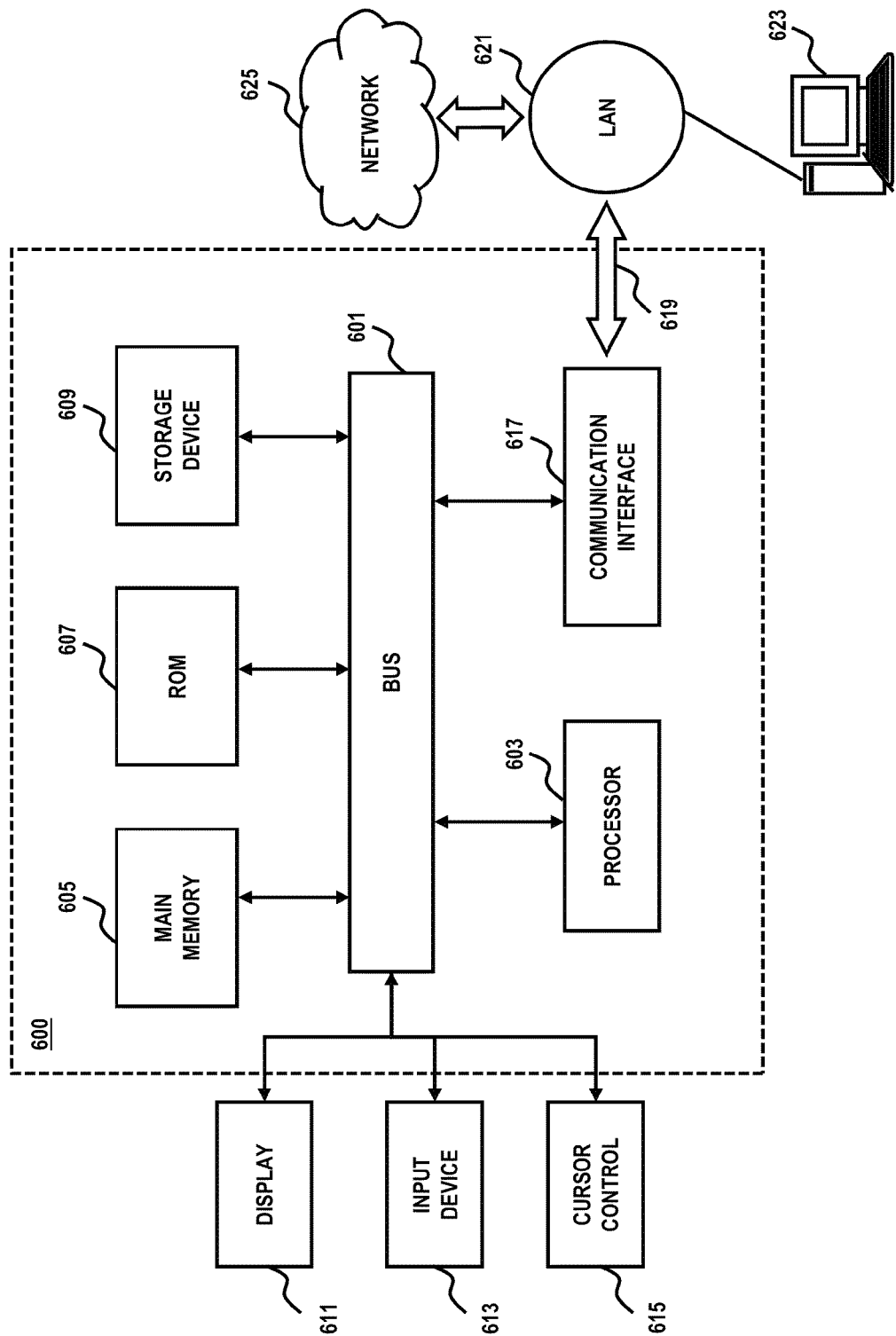
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 4, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
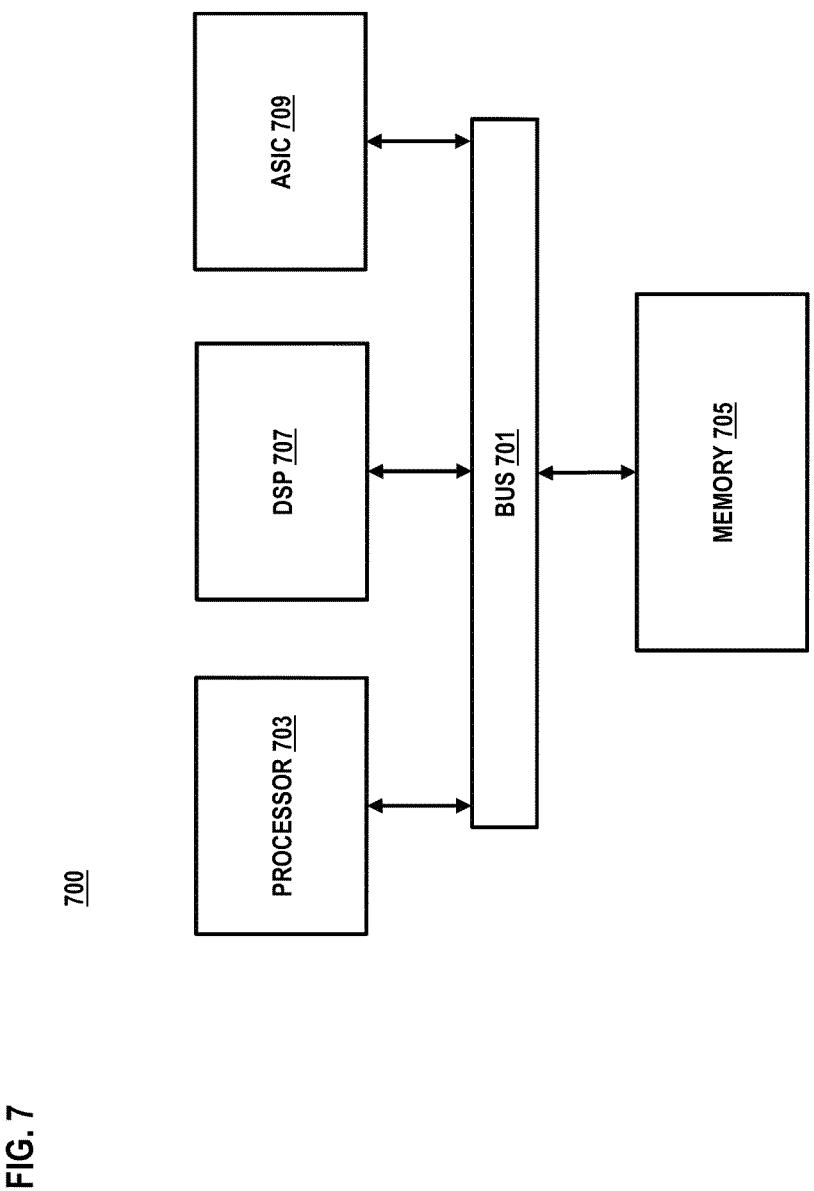
FIG. 7 is a diagram of a chip set that can be used to implement an embodiment of the invention.

FIG. 7 illustrates a chip set or chip 700 upon which an embodiment of the invention may be implemented. Chip set 700 is programmed to enable third party video content to be assigned a higher priority for delivery over a service provider network as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling third party video content to be assigned a higher priority for delivery over a service provider network.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable third party video content to be assigned a higher priority for delivery over a service provider network. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving, from a content delivery system associated with a third party content provider, a request for delivery of video content to a user device by way of a video on demand network within a service provider network of a network provider;
determining, based on an admission control policy of the network provider, whether the third party content provider or the video content fulfill one or more criteria for permitting the content delivery system direct access to the video on demand network; and
assigning a higher delivery priority to the video content based on the direct access of the video on demand network by the customer deliver system,
wherein the higher delivery priority corresponds to a delivery priority of video content that originates directly from a content center associated with the video on demand network.

2. A method of claim 1, further comprising:
establishing, based on the determination, direct access to the video on demand network by the content delivery system, wherein the direct access includes access to an internal content delivery system associated with the video on demand network by forming a direct connection, channel, or network pathway between the content delivery system and video on demand network.

3. A method of claim 1, further comprising:
determining a status of the video on demand network; and
determining, based on the status, a type of delivery priority to be assigned to the video content, a type of format of the video content, or a combination thereof,
wherein the status is based on an amount of congestion of the video on demand network, an amount of pending or scheduled delivery requests, a mode of operation of the video on demand network, or a combination thereof.

4. A method of claim 3, wherein the type of delivery priority is based on a quality of service marking associated with the video content and the delivery priority is adaptive.

5. A method of claim 1, further comprising:
pulling, in response to the direct access, the video content from the content delivery system,
wherein the admission control policy specifies that the third party content provider be registered with the network provider in advance of the request for delivery of the video content and that the video content be pushed in advance of the request for delivery of the video content, and the internal content delivery system of the video on demand network pulls the video content in real-time.

6. A method of claim 1, further comprising:
receiving in advance of the request, by the video on demand network, select video content from the content delivery system of the third party content provider based on metadata for specifying the select video content associated with the content delivery system; and
storing, based on the pulling, the select video content to the internal content delivery system associated with the video on demand network,
wherein the video content is retrieved from the internal content delivery system for delivery to the user device by way of the video on demand network.

7. A method of claim 1, further comprising:
assigning a different format to the video content based on the determination of whether the third party content provider or the video content to be delivered fulfills the one or more criteria,
wherein the different format enables the video content to substantially match a format of content that originates from a content center associated with the video on demand network.

8. A method of claim 7, wherein the assigned format of the video content is of a higher bit-rate or higher resolution.

9. A method of claim 1, wherein the determining whether the third party content provider or the video content fulfill one or more criteria includes cross referencing the third party content against established profile information for registered third party video content providers, the user device is subscribed with the network provider for accessing the video on demand network, and the user device is subscribed with the third party content provider for initiating a request for the video content.

10. An apparatus comprising:
at least one processor; and
at least one memory including computer program code for one or more programs,
the at least one memory and the computer program code configured to, with the at least one processor, cause the apparatus to perform at least the following,
receive, from a content delivery system associated with a third party content provider, a request for delivery of video content to a user device by way of a video on demand network within a service provider network of a network provider;
determine, based on an admission control policy of the network provider, whether the third party content provider or the video content fulfill one or more criteria for permitting the content delivery system direct access to the video on demand network; and
assign a higher delivery priority to the video content based on the direct access of the video on demand network by the customer deliver system,
wherein the higher delivery priority corresponds to a delivery priority of video content that originates directly from a content center associated with the video on demand network.

11. An apparatus of claim 10, wherein the receiving is by the service provider network and the apparatus is further caused to:
establish, based on the determination, direct access to the video on demand network by the content delivery system, wherein the direct access includes access to an internal content delivery system associated with the video on demand network.

12. An apparatus of claim 10, wherein the apparatus is further caused to:
determine a status of the video on demand network; and
determine, based on the status, a type of delivery priority to be assigned to the video content, a type of format of the video content, or a combination thereof,
wherein the status is based on an amount of congestion of the video on demand network, an amount of pending or scheduled delivery requests, a mode of operation of the video on demand network, or a combination thereof.

13. An apparatus of claim 12, wherein the type of delivery priority is based on a quality of service marking associated with the video content and the delivery priority is adaptive.

14. An apparatus of claim 10, wherein the apparatus is further caused to:
pull, in response to the direct access, the video content from the content delivery system,
wherein the admission control policy specifies that the video content be pushed in advance of the request for delivery of the video content, and the internal content delivery system of the video on demand network pulls the video content in real-time.

15. An apparatus of claim 10, wherein the apparatus is further caused to:
receive in advance of the request, by the video on demand network, select video content from the content delivery system of the third party content provider based on metadata for specifying the select video content associated with the content delivery system; and
store, based on the pulling, the select video content to the internal content delivery system associated with the video on demand network,
wherein the video content is retrieved from the internal content delivery system for delivery to the user device by way of the video on demand network.

16. An apparatus of claim 10, wherein the apparatus is further caused to:
assign a different format to the video content based on the determination of whether the third party content provider or the video content to be delivered fulfills the one or more criteria,
wherein the different format enables the video content to substantially match a format of content that originates from a content center associated with the video on demand network.

17. An apparatus of claim 16, wherein the assigned format of the video content is of a higher bit-rate or higher resolution.

18. An apparatus of claim 10, wherein the user device is subscribed with the network provider for accessing the video on demand network and the user device is subscribed with the third party content provider for initiating a request for the video content.

19. A system comprising:
an admission control policy database of a network provider for specifying one or more criteria for permitting a content delivery system of a third party content provider direct access to a video on demand network within a service provider network of the network provider; and
an internal content delivery system of the video on demand network for assigning a higher delivery priority to the video content based on the direct access of the video on demand network by the content delivery system,
wherein the higher delivery priority corresponds to a delivery priority of video content that originates directly from a content center associated with the video on demand network.

20. A system of claim 19, wherein the type of delivery priority is based on a quality of service marking associated with the video content and the delivery priority is adaptive.

* * * * *